US009465361B2

(12) United States Patent
Smithwick et al.

(10) Patent No.: US 9,465,361 B2
(45) Date of Patent: Oct. 11, 2016

(54) IMAGE BASED MULTIVIEW MULTILAYER HOLOGRAPHIC RENDERING ALGORITHM

(71) Applicant: DISNEY ENTERPRISES, INC., Burbank, CA (US)

(72) Inventors: Quinn Y. Smithwick, Pasadena, CA (US); Jhen-Si Chen, Cambridge (GB); Daping Chu, Cambridge (GB)

(73) Assignees: Disney Enterprises, Inc., Burbank, CA (US); Cambridge Enterprise Limited, Cambridge (GB)

( * ) Notice: Subject to any disclaimer, the term of this patent is extended or adjusted under 35 U.S.C. 154(b) by 14 days.

(21) Appl. No.: 14/525,345

(22) Filed: Oct. 28, 2014

(65) Prior Publication Data

US 2015/0277378 A1    Oct. 1, 2015

Related U.S. Application Data

(60) Provisional application No. 61/972,978, filed on Mar. 31, 2014.

(51) Int. Cl.
  *G03H 1/08* (2006.01)
  *G03H 1/22* (2006.01)
  *G03H 1/30* (2006.01)

(52) U.S. Cl.
  CPC .......... *G03H 1/0808* (2013.01); *G03H 1/2205* (2013.01); *G03H 1/2294* (2013.01); *G03H 1/30* (2013.01); *G03H 2001/221* (2013.01); *G03H 2210/454* (2013.01)

(58) Field of Classification Search
  CPC ....................................................... G03H 1/16
  See application file for complete search history.

(56) References Cited

U.S. PATENT DOCUMENTS

2013/0022222 A1*  1/2013  Zschau ............... G03H 1/0808
                                                        381/306
2013/0107336 A1*  5/2013  Wey ..................... G03H 1/0808
                                                           359/9

* cited by examiner

*Primary Examiner* — Jennifer L. Doak
(74) *Attorney, Agent, or Firm* — Robert G. Crouch; Marsh Fischmann & Breyfogle LLP

(57) ABSTRACT

Algorithms for improved and more efficient rendering of three-dimensional images for use with holographic display systems. These algorithms include creating layers orthogonal to a viewing direction, the separate layers representing different depths in the image. The layers are created based on knowing the color and depth of each point in the image. Each layer then goes through an FFT process until the information for each layer is represented as a diffraction pattern. A holographic lens is then applied to the diffraction pattern of each layer. This lens will cause that layer to appear, in a hologram based thereon, at a different depth than the other layers. The layers, each with their separate lenses, are then coherently summed up and when applied to a suitable portion of a holographic display system (e.g., an SLM), a hologram can be created for that view. A tiled array of such holograms can be combined together by the holographic display system.

19 Claims, 9 Drawing Sheets

IMAGE BASED MULTIVIEW MULTILAYER HOLOGRAPHIC RENDERING ALGORITHM

CROSS-REFERENCE

This application is a non-provisional application that claims priority from U.S. Provisional Patent Application No. 61/972,978, filed on Mar. 31, 2014, and entitled "Image Based Multiview Multilayer Holographic Rendering Algorithm," which is incorporated herein by reference in its entirety.

BACKGROUND

Holography is a technique that enables three-dimensional (3-D) images to be generated, recorded, and later displayed. It may involve the use of a laser, interference, diffraction, light intensity and phase recording, and suitable illumination of the recording. The image changes as the position and orientation of the viewing system changes in exactly the same way as if the object were still present, thereby making the image appear in 3-D. The holographic recording itself is not an image, since when viewed it appears to be made up of an apparently random structure of varying intensity, density, or profile. Holographic displays, also known as holographic video or electro-holography, compute the interference pattern directly, present that pattern on a spatial light modulator (SLM) and, together with suitable illumination, produce an updatable holographic image.

As the demand for 3-D displays rapidly grows, holographic displays are considered by many within the 3-D entertainment industry as the ultimate goal of 3-D displays. Such high regard is held for these devices because holographic displays are capable of displaying all the 3-D cues of a real scene to a viewer. These cues include stereopsis, vergence, accommodation, parallax, occlusion, and shading. Unfortunately, to date, designing and fabricating holographic displays have proven difficult due to one or more difficult challenges that have limited display size, field of view, frame rate, and/or prevented providing both horizontal and vertical parallax.

In this regard, to create a large holographic display with a wide field of view (fov), the pitch of the display's spatial light modulator (SLM) must be fine (e.g., less than 1 micrometer (μm) and more typically less than 0.5 μm for an approximately 30° fov) over the entire large area of the display (e.g., 127 millimeters (mm) by 100 mm or the like). Unfortunately, the pitches of most common SLMs, such as digital micromirror devices (DMDs) or liquid crystal on silicon (LCOS) devices, are typically only as coarse as about 5 to 10 μm and are the same horizontally and vertically, providing only 1° to 3° fov. Further, the pitches are only maintained over small areas in these devices such as over 20 mm by 20 mm. Demagnifying optics can be used to increase the pitch and field of view but at the generally unacceptable expense of the image size (and vice versa) due to the Lagrange Invariant (i.e., for an optical system of only lenses, the product of the image size and ray angle is constant).

In some attempts to provide an improved holographic display, multiple SLMs have been tiled together to increase either the size or field of view of the hologram. With simple spatial tiling of multiple SLMs to increase the size of the hologram, however, there are noticeable seams in the holographic image due to gaps between the SLMs from the borders and electronics. Spatial tiling a single SLM has also been achieved using replication optics or using 2-axis scanners. Gaps and misalignments in the spatial tiling appear at the hologram plane and visually interfere with and confuse the 3-D imagery. Multiple SLMs have also been arranged in an arc, with precision optical mounts, to increase the field of view. The holographic images overlap in the center of the arc, a far distance from the SLMs, with a corresponding reduction in the holographic image's resolution the further the distance from the SLM. Several of these systems use an asymmetric diffusing screen, producing horizontal parallax only (HPO) images. Some also use acousto-optical modulators (AOMs) capable of providing traveling acoustic waves of pitches of about 5 μm over larger lengths. These large lengths can be arranged into widths of about 1 meter by heights of about 100 mm. However, to cancel the motion of the traveling waves, descanning optics and scanners are required. Also, other optics may be required to create higher pitches at the expense of display width. Further, the acoustic waves only diffract in one direction, and the resulting hologram is necessarily HPO.

Due to the horizontal arrangement of the human eyes, horizontal parallax is more important than vertical parallax for binocular stereopsis and motion parallax. This fact is often used in horizontal parallax only (HPO) holographic displays to reduce computation and data bandwidth requirements compared to full parallax holographic displays. However, the appearance of the HPO hologram does not change with vertical motion of the viewer and their viewing location or point of view. In other words, a single viewer may move their head up and down vertically (e.g., be sitting or squatting and then stand up), and the hologram's appearance would not change as would a true 3-D object. In some artistic and entertainment applications, especially those provided for single stationary viewers, the loss of vertical parallax may be acceptable.

Vertical parallax is important to fix absolute position in space. In many 3-D display implementations, the loss of vertical parallax is not acceptable, which has led some experts in the 3-D display industry to argue that a holographic display that is HPO is a "non-starter." For example, in implementations involving interaction with the hologram or involving multiple viewers that collaborate (e.g., point to or interact with the same location on the holographic image), the holographic display will be ineffective unless there is at least a small amount of vertical parallax. Such "limited vertical parallax" may be necessary for the viewers to see or experience a consistent scene from differing points of view. Due to human kinetics (e.g., it is easier for humans to shift their views left and right than up and down), the amount of desirable vertical parallax is often much lower than a desirable amount of horizontal parallax.

Hence, there is a need for holographic displays or holographic display systems that address some of these challenges. Preferably, such new holographic displays would provide a relatively large 3-D image or hologram and would provide some amount of vertical parallax (e.g., provide limited vertical parallax). An issue, though, facing such development is that providing different amounts of information and fields of view in the horizontal and vertical directions is difficult with current full parallax holographic displays. With common square pixel SLMs, the horizontal and vertical pitches and, therefore, the fields of view are the same (unless anamorphic optics are used, which often is not desirable due to astigmatic aberrations, cost, manufacturing and design complexity, and other concerns).

Further, there is a need to provide techniques and algorithms for generating the content to be displayed on such holographic displays. Similarly, there is a need to be able to increase the speed of that content generation as well as to be able to store the content in a reasonable amount of memory space.

It is against this background that the techniques described herein have been developed.

SUMMARY

Disclosed herein is a computer-implemented method for computing an array of holographic diffraction patterns each representative of an image of a particular scene. The method includes, for the first of the holographic diffraction patterns of the array, obtaining a color image of one view of the scene; obtaining corresponding depth information about the scene; creating image layers from the color image and the depth information; encoding spatial information in each of the image layers into a diffraction pattern for that layer; and adding together the diffraction pattern information for each of the image layers to compute the holographic diffraction pattern representative of that view, and then repeating the above operations for each of the other holographic diffraction patterns of the array where each holographic diffraction pattern is representative of a different view of the scene.

The method may further include for each layer adding a holographic lens to the diffraction pattern information for that layer. The color image and the corresponding depth information may come from computer graphics rendering. The color image and the corresponding depth information may come from a camera. The method may further include displaying images based on the array of holographic diffraction patterns with a tiled holographic display system. The operation of creating image layers may include thresholding based on the depth information. The operation of creating image layers may include depth blending based on the depth information. The operation of converting spatial information into diffraction pattern information may include performing a Fast Fourier Transform. The method may further include storing the array of holographic diffraction patterns. The method may further include displaying holographic images based on the stored array of holographic diffraction patterns. The method may further include displaying holographic images based on the stored array of holographic diffraction patterns.

Also disclosed herein is a method for computing and displaying an array of holographic images. The method includes, for the first of the holographic images of the array, obtaining a color image of one view of the scene; obtaining corresponding depth information about the scene; creating image layers from the color image, the depth information, and depth blending; encoding spatial and depth information in each of the image layers into diffraction patterns for that layer; and adding together the diffraction patterns for each of the image layers to compute the holographic diffraction pattern representative of that view, repeating the above operations for each of the other holographic diffraction patterns of the array where each holographic diffraction pattern is representative of a different view of the scene; and then displaying each of the array of a holographic images on an angularly-tiled holographic display system.

Also disclosed is a computer-implemented method for computing an array of holographic diffraction patterns each representative of an image of a particular scene. The method includes, for the first of the holographic diffraction patterns of the array, creating image layers that include color image, depth information, and depth blending about one view of a scene; encoding spatial information in each of the image layers into a diffraction pattern for that layer; and adding together the diffraction pattern for each of the image layers to compute the holographic diffraction pattern representative of that view; and then repeating the above operations for each of the other holographic diffraction patterns of the array where each holographic diffraction pattern is representative of a different view of the scene.

DETAILED DESCRIPTION

Figure 1:
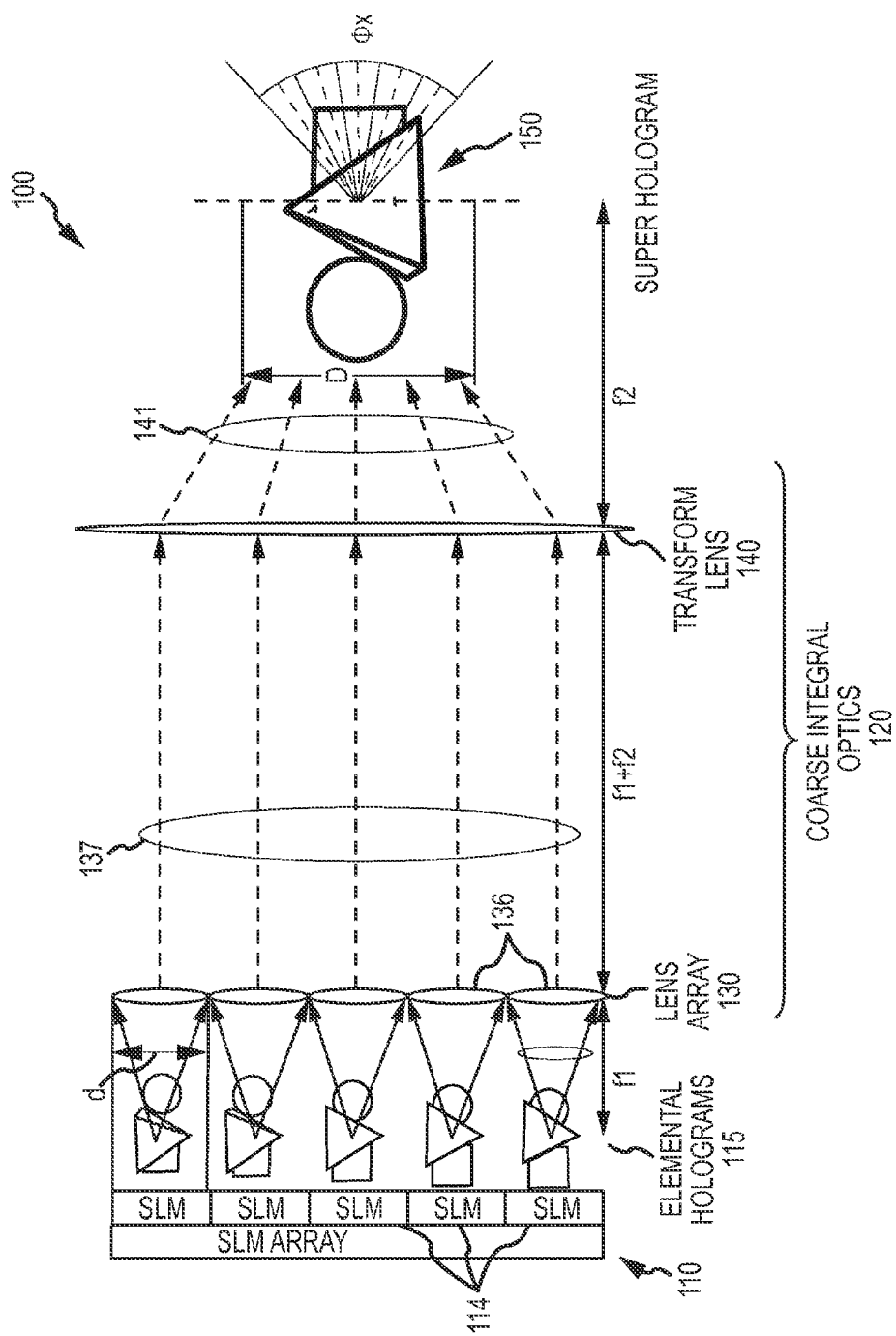
FIG. 1 illustrates in schematic or functional block form one embodiment of a holographic display or coarse integral display system.

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

Generally, disclosed herein are improved techniques for generating 3-D content (diffraction patterns) that can be used with an angularly-tiled holographic display system. These techniques include creating image layers that are each orthogonal to a viewing direction, the separate layers representing different depths in the image. The layers are created based on knowing the color and depth of each point in the image. Each layer then goes through a Fast Fourier Transform (FFT) process, producing the holographic diffraction pattern corresponding to the layer's 2D image. When replayed, the diffraction pattern reproduces the image of the 2D layer at "infinity"; a lens may be used to replay the 2D image at a distance equal to the focal distance of the lens. The lens may be a separate holographic lens applied to the diffraction grating of each layer. This lens will cause that layer to appear, in a replayed hologram based thereon, at a different depth than the other layers. The diffraction patterns for the layers, each with their separate lenses, are then summed up and when applied to a suitable portion of a holographic display system (e.g., an SLM), a holographic multilayer 3D image can be replayed for that view. An angularly tiled array of such holograms can be combined together by the wide field-of-view holographic display system.

An exemplary holographic display system 100 for displaying 3-D image content as described herein is shown in FIG. 1. The system 100 can be used to produce an angularly tiled 3-D hologram or super hologram 150 (e.g., a sphere, a cube, and/or a pyramid in this illustrated example). Briefly, the system 100 is shown to include an array 110 of hologram sources/projectors 114, which may take the form of SLMs such as digital mirror devices (DMDs), liquid crystal on silicon (LCOS) devices, optically addressed SLMs (OASLMs), electrically addressed SLMs (EASLMs), or the like. These are each operated to output an elemental hologram 115, and these are combined by a coarse integral optical assembly 120. Particularly, the holograms 115 are displayed or projected towards a first surface or backside of a lens array 130 made up of a lens 136 for each of the hologram sources 114. From a second surface of the lens array 130, the output light 137 from the lenses 136 is directed toward a transform lens 140, which acts to combine (angularly tile) the light/images as shown at 141 to provide the super hologram 150 from the elemental holograms 115.

In the configuration of FIG. 1, the coarse hologram system 100 may include a number (e.g., 1 to 6 or more) of SLMs 114 that are operated concurrently to provide an array of elemental holographic images 115, which are transmitted through a lens array 130 and a large transform lens 140. Typically, the SLMs 114 and elemental images 115 are located in the system 100 at or near the focal plane of the lens array 130. Further, the lens array 130 and the large transform lens 140 are spaced apart by the sum of their focal lengths as shown in FIG. 1 so as to form an afocal $4f$ magnified relay system with assembly 120. The resulting super hologram plane of output hologram 150 is located at the focal plane of the large transform lens 140. The super hologram 150 can be seen by a viewer (not shown) located to the right of the super hologram 150 in FIG. 1.

The field of view in one direction of the super hologram 150 is related to $n_x$ or $n_y$, the number of elemental images 115 in that direction. The number of elemental images 115 (i.e., number of SLMs 114 in the array 110) can be selected to be different in the horizontal and vertical directions (i.e., $n_x$ does not have to equal $n_y$), which can be used to provide different fields of view for hologram 150. The resulting hologram 150 may be further demagnified to decrease its image size and increase its field of view (or vice versa) in particular implementations of the system 100.

A coarse integral holographic display can be used to generate holographic images or super holograms that exhibit full parallax with different fields of view in the horizontal and vertical directions. The super hologram also exhibits accommodation, occlusion, and view-dependent shading. The holographic image appears to the viewer to be a real image floating in front of the display (e.g., in front of the transform lens). The entire volume of the holographic image, in front of and behind the super hologram plane, is accessible for interactive applications, which may require or prefer to have full parallax.

Although many SLMs have coarse pitches over small areas, many SLMs are capable of high bandwidth and frame rates, e.g., DMDs are capable of several thousand binary frames per second. However, only 15 to 60 frames per second are needed for apparent continuous motion. The additional bandwidth/frames per second can be used to sequentially create multiple elemental holograms with a single SLM, which can then be spatially tiled behind the lens array using 2D scanners and then angularly tiled using the coarse integral optics. The SLM temporally multiplexes the elemental holograms, the 2D scanner spatially multiplexes the elemental holograms, and the coarse integral optics angularly multiplexes the elemental holograms.

The scanning system may include an SLM, a 4 f optical relay, and a scanner located at the optical relay's Fourier plane. The SLM is located at the front focal plane of the first lens. The scanner is located at the rear focal plane of the first lens and also the front focal plane of the second lens (scanning on the Fourier plane). The scanned and translated SLM image is located at the rear focal plane of the second lens. The SLM rapidly displays elemental holograms (computed to display holographic images from the appropriate viewpoints) that are synchronized to the 2D scanner and SLM image location. To tile the SLM image without motion blur caused by scanning, the SLM illumination can be flashed when the scanner and SLM image are at the tile locations. The scanner spatially tiles multiple SLM images behind the lenslet array. As with other configurations, a large transform lens is provided for angularly tiling the rapid sequence of elemental holograms generated by the single SLM into a super hologram.

The display systems taught herein may be thought of as providing angular tiling with their coarse integral optics. Such angular tiling has advantages over spatial tiling of SLMs. With spatial tiling, there are noticeable seams in the generated or output holographic image due to gaps between the SLMs from the borders and electronics. Gaps and misalignments in the spatial tiling appear at the hologram plane and visually interfere with and confuse the 3-D imagery.

In contrast, with angular tiling as provided by the displays of the present description, the seams appear as gaps in the angular views. Small missing view zones are visually less obtrusive and can further be blended using a light diffuser (not shown in FIG. 1 but readily understood by those skilled in the art). Angular misalignments result in disjointed motion parallax. The angular tiling also lends itself to view-dependent holographic rendering algorithms, such as holographic stereogram and diffraction specific parallax panoramagrams. Further, view-dependent holographic algorithms naturally handle view-dependent lighting and shading, occlusion, and accommodation cues in the holographic images.

Further details on the holographic display system 100 are disclosed in co-pending U.S. patent application Ser. No. 13/852,456, entitled "Course Integral Holographic Display," the entire contents of which are incorporated herein by reference. It should be understood, however that the described holographic display system 100 is but one non-limiting example of a display system that the images and content generated with the techniques disclosed herein could be generated.

What has been developed are holographic rendering algorithms to create real-time dynamic 3-D holographic content for a course integral holographic display 100 or other angularly tiled displays. It is desirable to create holograms with view-dependent shading, occlusion with parallax, and proper vergence/accommodation cues, with all this being accomplished over a large area and wide field of view. Generally, most holographic rendering algorithms include two main portions: (1) transforming 3-D data into an information format which is suitable for the hologram calculation, and (2) the actual computation of the holographic diffraction pattern. Below, a first version of such an algorithm and a second, improved version will be described.

A first step toward developing these new algorithms concentrated on the second portion above—computing holographic diffraction patterns for multiple sets of 2-D layered images. Each 2-D image is converted into a Fourier-hologram that is efficiently computed using a Fast Fourier Transform. Each layer's hologram also includes a pre-computed holographic lens to focus that layer's 2-D image to its appropriate corresponding depth. All the layer holograms are added together to create recreate the final hologram reproducing the 3-D object.

This 3-D holographic image would normally appear semi-transparent and also have view-dependent artifacts. To include occlusion and make the object appear solid, for each layer, light from the hologram plane is computationally propagated forward, using the 2-D image silhouette masks of the other planes as occluders. Then, the resultant light is propagated back to the hologram plane.

Figure 2:
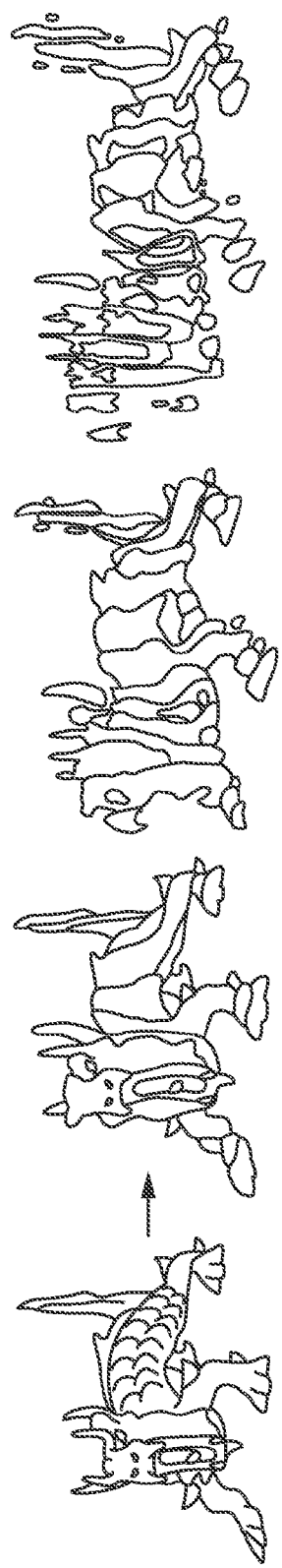
FIG. 2 is an illustration of a scene showing a dragon, and the effect of slicing the scene into depth layers, in that gaps can be seen between the layers.

FIG. 2 shows four different views of these layers. In this disclosure, a hologram for a chosen 3-D model of a dragon (36 k vertices and 68 k polygonal faces) is calculated using the layer-based approach (in 30 layers). The left-most of the views in FIG. 2 shows a view taken from a direction substantially orthogonal to the layers. From this angle, one cannot tell that they are seeing a plurality of masked discrete layers to approximate the occlusion effect. For each succeeding view to the right in FIG. 2, the viewing direction is moved to the viewer's right until it is more and more clear to the viewer that the image being viewed is a plurality of layers. For a sparse number of levels, the layer positions are at discrete depths giving the impression of blocking discontinuous surfaces. More levels can be used, but this increases computation time. Alternatively, depth blending (aka depth antialiasing, or depth fusion) between layers may be used to visually approximate more layers and smooth surfaces. Virtual pixels/layers may be placed at depths between displayed layers by splitting the virtual pixel's intensity between the two closest displayed layers based on the virtual pixel's depth provided by the depth map. For example, for a virtual pixel, three-quarters the depth between a front and back displayed plane would display a front pixel with one quarter the virtual pixel's intensity and a back pixel three-quarters the virtual pixel's intensity. Using depth blending, a viewer will visually combine the two overlapping pixels at different layers depths and perceive a virtual pixel at a depth between the two layers. However, this effect works only with a small field of view, until the front pixel no longer is visually aligned with its corresponding back pixel.

Figure 3:
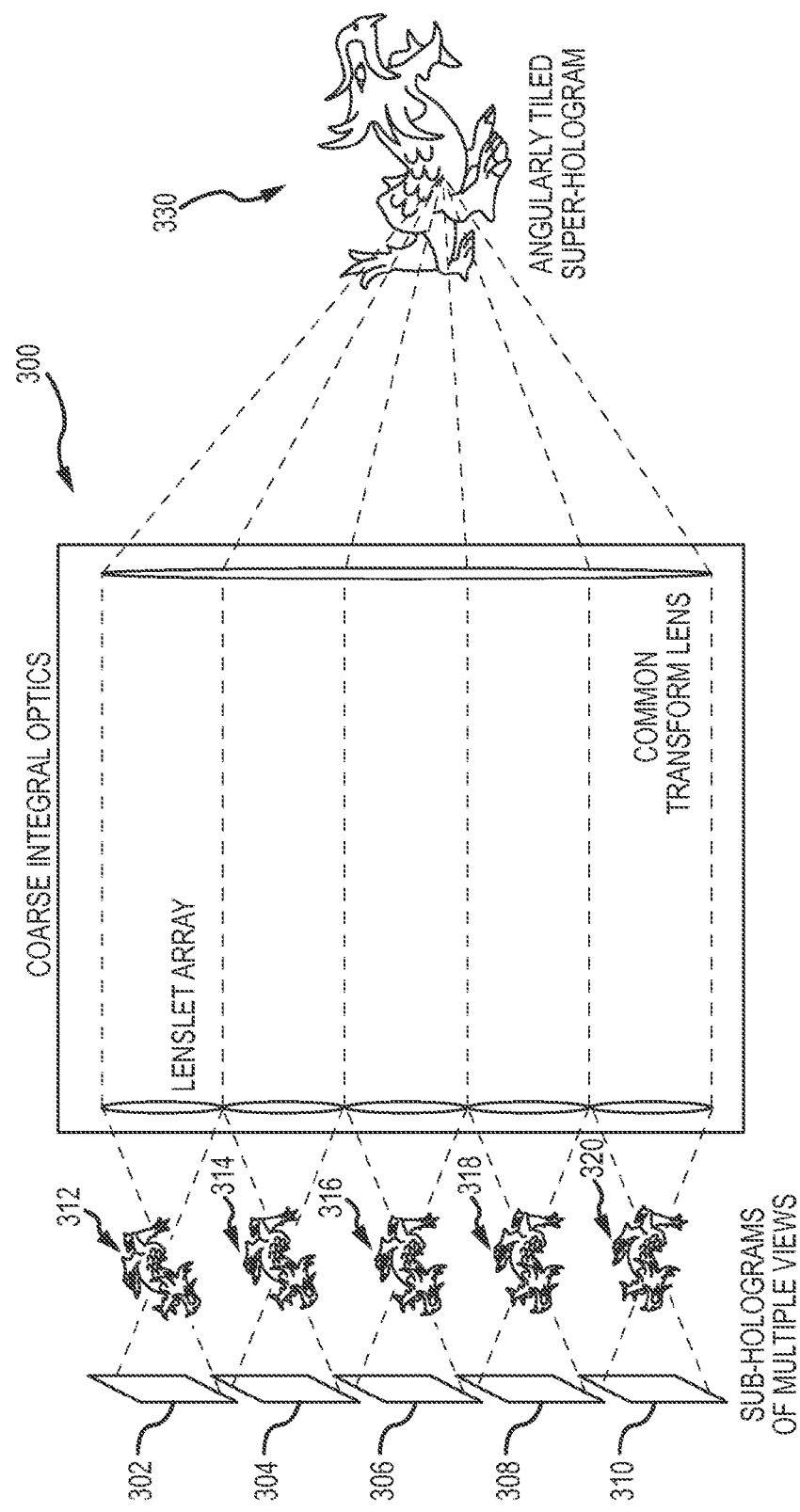
FIG. 3 is an illustration of a course integral holographic display system, in which multiple sub-holograms corresponding to different viewing angles are integrated optically to provide a realistic 3-D view of the scene through angular tiling.

To handle view-dependent lighting, and hide the layering, occlusion hole (lack of occlusion), and depth blending artifacts that become apparent with off-axis viewing (as described above in conjunction with FIG. 2), multiple layered holograms are created from different viewpoints, and they are then reconstructed and angularly tiled using the display 100. This is shown in FIG. 3, in which a less-detailed version of a coarse integral holographic display 300 is shown which includes (in this simple example) five different SLMs 302, 304, 306, 308, and 310 that each produce a different sub-hologram 312, 314, 316, 318, and 320, respectively. As can be seen, the sub-holograms 312-320 each provide a "view" of the dragon subject from a different viewing angle. These sub-holograms 312-320 are angularly tiled together to create a super-hologram 330. As the viewer moves to different locations, they will see different aspects of the dragon from different views.

Figure 4:
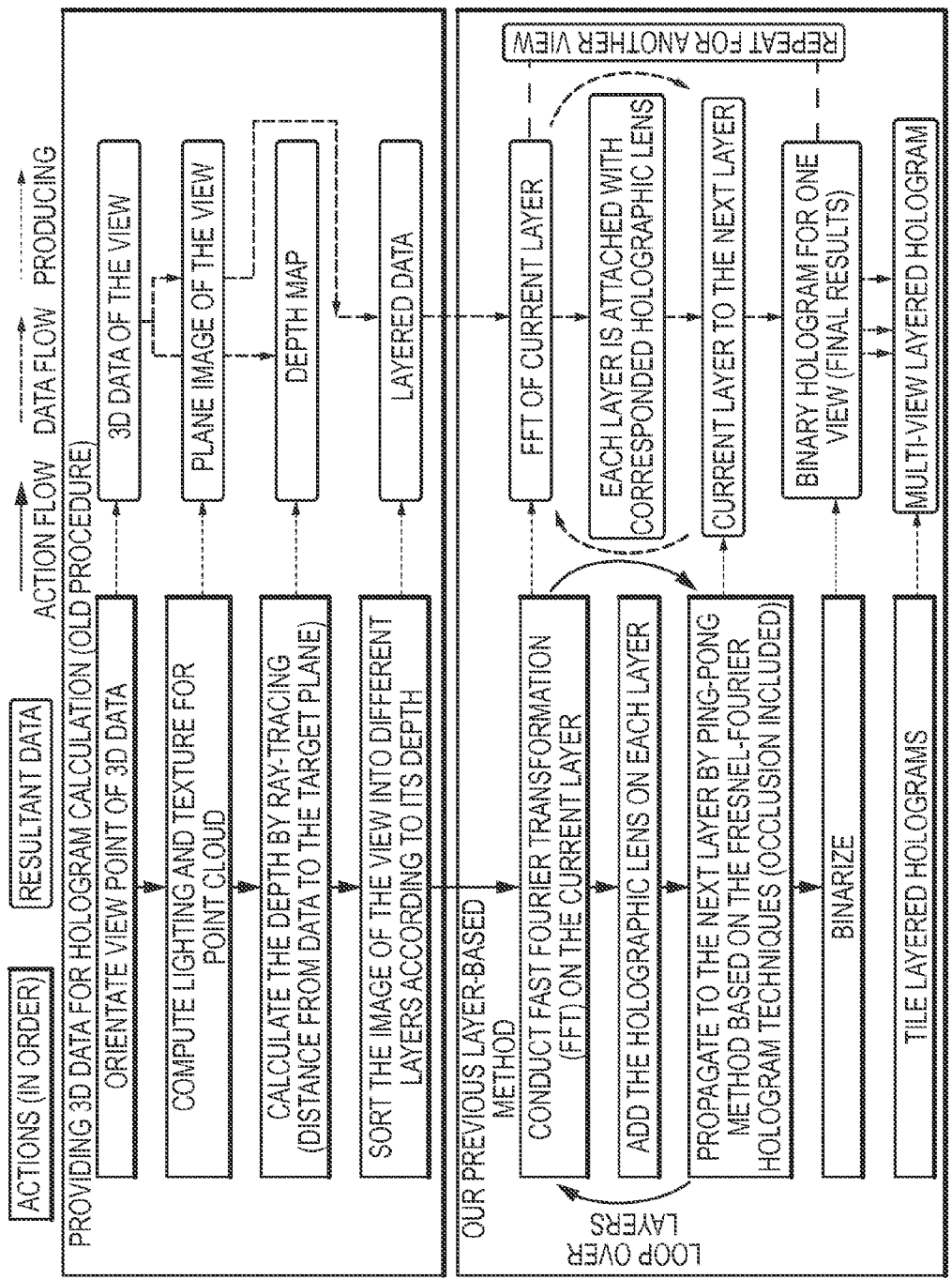
FIG. 4 is a flowchart of the procedure and the resultant data in a first version of a layer-based algorithm.

This addresses the actual computation of the holographic diffraction pattern, but does not sufficiently address the transforming of 3-D data into an information format which is suitable for hologram calculation. A first attempt to do this is shown in FIG. 4. It was based upon a 3-D point cloud with defined normals and point colors. For each view, every point in the 3-D point cloud must be transformed (translated, rotated, scaled) so that it appears appropriately from the corresponding viewpoint. The shading and texture of each point is computed based on the lighting direction, the defined normal, the point color, and a lighting model. The depth of each point from the viewpoint is computed via ray tracing. Points are sorted into discrete layers normal to the viewing direction based upon their depths. To create a color 2-D image of each layer, without visible gaps between sampled points, a circle is drawn or "splatted" for each point in each layer. A silhouette mask of each layer was derived from the color image as well. This creates the layer data. Next, a Fast Fourier Transform (FFT) is conducted on each layer. Following this, the corresponding holographic lens is added to each layer. To include occlusion and make the holographic object appear solid, a Ping-Pong method was used. For each layer, the Ping-Pong method computationally propagates light from the hologram plane forward with other planes' 2-D image mask silhouettes acting as occluders, then propagates the resultant light back to the hologram plane. After that, all of the layers are summed up, and then they are binarized. Next, all of the layered holograms are tiled together.

While the algorithm described above was an improvement over the prior art, it was believed to be time-consuming and inefficient. It used unconventional 3-D model formats (3-D point clouds with attached color and normals), used custom rendering routines (per point transformation, lighting, and texturing), and repeatedly operated on dense 3-D data sets, many of the points of which may later be hidden from view. The occlusion handling was also in the computationally intensive hologram computation step. In an effort to further improve the efficiency of the 3-D data into a suitable information format for hologram calculation, the following improvements were developed.

The improved and efficient process creates multiview layered holograms based on transforming standard 3-D animated models (or alternatively, color+depth movies) into multiple sets of layered 2-D images captured from multiple viewpoints. View dependent lighting, texturing, occlusion, and depth sorting are naturally incorporated into this step, using a standard, efficient, and hardware-accelerated graphics pipeline. These sets of multiple view layered 2-D images are then used with a modified version of the previously-described computation of the holographic diffraction pattern.

It should be explained that the 3-D information generated and displayed with the techniques herein relies on having both color information and depth information about a scene. Most typically that color and depth information is obtained in digital form from computer-generated images (CGI) or from specialized cameras that can provide both depth and color information. It should be understood that the depth referred to here is not color depth, but depth in terms of distance of specific portions of the scene from the viewer, on a pixel-by-pixel (or groups of small pixels) basis, just as the color information is provided. Such cameras are currently produced under the name Kinect by Microsoft and PrimeSense (recently acquired by Apple). The depth may come from structured light, from defocus, or from multiple cameras (e.g., photogrammetry). Traditionally, most cameras provide only what is referred to here as color information. In the case of monochrome cameras, this color information may also be described as grayscale or brightness. In the case of color cameras, the information includes not only the brightness component but the color component. A color plus depth camera captures not only provides color information but also depth information.

Figure 5:
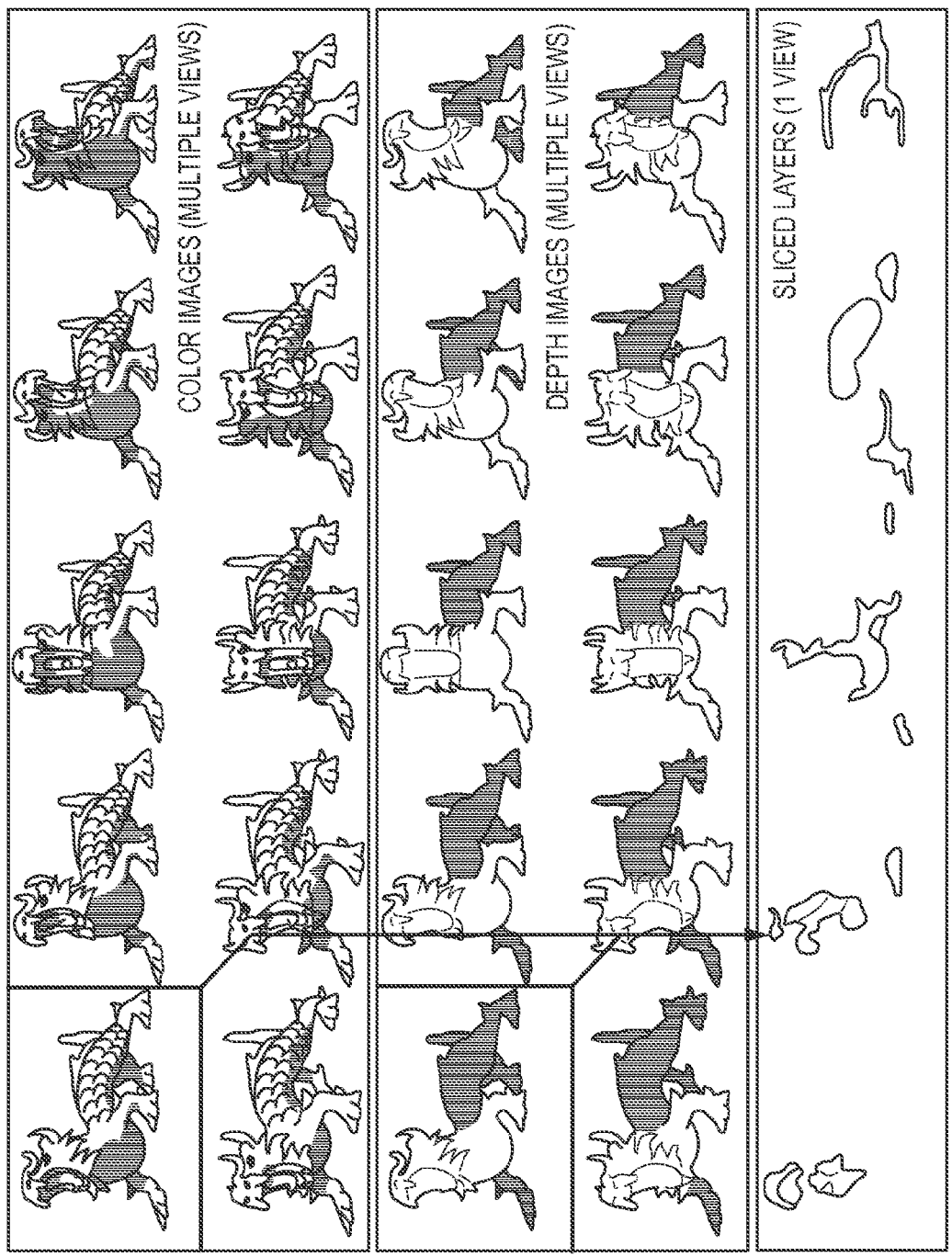
FIG. 5 is a 2-D rendering of a 3-D dragon in different viewing angles as image projections (top two rows), their depth map (third and fourth rows), and the layers for one view (bottom row) used in this work for angular tiling.

This concept can be further understood with reference to FIG. 5, which includes five rows of separate images. The top two rows include ten different views of color images of a dragon (note that the drawings in the patent application are not actually in color, nor are they even in gray-scale; instead darker areas are shown with stippling and lighter areas without). The third and fourth rows include ten different views of depth images of the dragon. The bottom row includes views of five separate layers produced by combining the color and depth information. The top row of color image views each show a view from five different horizontally-displaced positions, yet taken from the same general elevational position. Note the relative height of the four feet of the dragon. The second row of color image views each show a view from five different horizontally-displaced positions, yet taken from the same general elevational position that is relatively above the elevational position used for the top row of color image views. Note the relative height of the four feet of the dragon in the second row. Similarly, the top and bottom rows of the depth images correspond to the same viewing angle as the top and bottom rows of the color images. This can be seen by noticing the relative position of the feet of the dragon. The depth information is encoded in the depth images in grayscale (intensity) (although not shown in gray scale in the patent application drawings; instead darker areas (which correspond to greater distances from the camera/viewer) are shown with stippling), with white representing the closest portions of the dragon, lighter gray representing intermediate depth portions of the dragon, and dark gray representing the furthest-away portions of the dragon. Thus, in the leftmost depth image in the top row of depth images, it can be seen that the mouth region of the dragon and a portion of the front left foot have the highest intensity. This means that those portions are the closest to the viewer. This depth image corresponds to the leftmost color image in the top row of the color images. It can be seen that the leftmost color image in the top row is a two-dimensional image that provides fine structural detail as well as information about lighting and shading. Because the corresponding depth image provides information on a pixel-by-pixel basis about the depth of each pixel, this can be combined together with the color image, via a thresholding algorithm, to produce layers. Each separate layer represents the region on the dragon from that view angle that is in a particular depth range from the viewer. The intensity seen in FIG. 5 in the sliced layers is the intensity information from the color image.

The techniques disclosed herein cover optimization of the content rendering and preparation pipeline (lighting, texturing, occlusion handling, multiview rendering, and slicing), which is then used by the hologram calculation algorithm. The hologram calculation requires multiple sets of layered 2-D images that slice the 3-D model from a different viewing direction, with each set's slices being normal to that set's viewing direction.

To create these image sets, in one embodiment we can use OpenGL, a standard computer graphics application programming interface (API), to render color images of a standard 3-D polygon model from different viewing directions. Corresponding depth images of the 3-D model are also rendered. The 3-D model can be divided into N layers on the depth grid using the depth map of that direction. For simplicity, we can use equally-spaced layers, however in more complicated applications we can use uneven spacing. OpenGL quickly and efficiently renders each view with view transformation, depth sorting and occlusion, shading and texture, and rasterization together in one pass, thus providing separate color and depth images for each view. OpenGL's pipeline can be performed in parallel on a GPU, instead of the multiple custom subroutines in the earlier version with multiple data types performed sequentially on the CPU. The sets of layered 2-D images are created by using thresholded depth maps as masks for the color image.

We can then calculate the sub-hologram for each layer by combining the FFT of the sliced 2-D image and a pre-computed holographic lens pattern of the corresponding focus depth. Then we stack up (coherently add) all the sub-holograms for different layers together to produce the final hologram for that viewing direction. Thus, that final hologram contains the information of all N layers, each of which has its own holographic lens. We then repeat creating and combining sub-holograms for the other viewing directions using the other sets of layered 2-D images.

Figure 6:
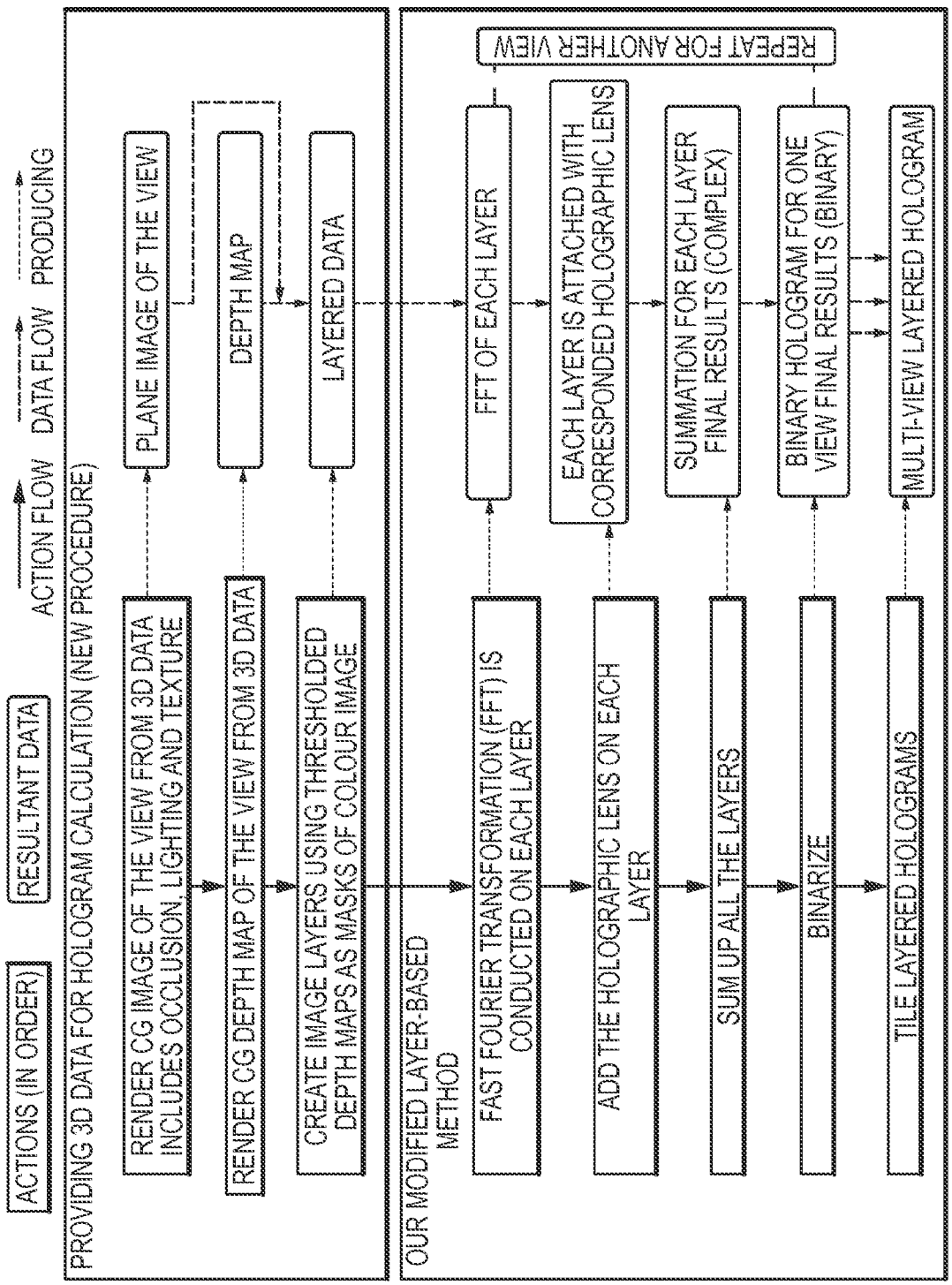
FIG. 6 is a flowchart of the procedure and the resultant data in the improved, image-based, multiview layered hologram algorithm.

The resulting holograms are tiled into an array and displayed on the previously-described display 100, which optically combines the holograms into a large field-of-view super hologram with continuous parallax, view-dependent shading, occlusion and disocclusion with parallax, and proper vergence/accommodation cues. In more detail, as shown in FIG. 6, to combine the techniques mentioned above and integrate different attributes for a 3-D image to display, data rendering and hologram calculation are carried out in the following order: (1) define spatial coordinates and normal vector directions of a 3-D model, fix a lighting direction, and select a viewing direction; (2) render a 2-D image and its depth map to compose the 3-D data for the chosen viewing direction; (3) perform a corresponding sorting/slicing on the 3-D data using the depth map (using thresholded depth maps masking the color image to produce each layer); (4) calculate the FFT of that image attached with the pre-computed holographic lens pattern for each layer; (5) stack up all the layers together to produce the final hologram for that viewing direction; and (6) repeat steps (1)-(5) for another viewing direction. The procedure is applied to every viewing direction included in the reconstruction. It should be mentioned that for hologram calculations, "combine" refers to element-to-element matrix multiplication and "stack up" refers to element-to-element matrix addition.

By way of comparison between the prior art and the first and improved second version of the algorithm described here, point-based holographic rendering models decompose the 3-D scene into a point cloud, use the diffraction equations to calculate the hologram pattern point-by-point, and then coherently sum those patterns to produce the final hologram. Typically, the 3-D reconstructed object appears as a semi-transparent volumetric set of diffuse 3-D points. Occlusion and shading can be added with increased complexity.

Polygon-based methods use a number of triangles to compose a 3-D scene. The holographic pattern of each triangle is calculated and then rotated to the corresponding position in the frequency domain. Occlusion and view-independent Lambertian shading can be added with increased complexity.

The first version of the algorithm was a modified layer-based method. It was based upon a 3-D point cloud with defined normals and point colors. For each view, every point in the 3-D point cloud must be transformed (translated, rotated, scaled) so that it appears appropriately from the corresponding viewpoint. The shading and texture of each point is computed based on the lighting direction, the defined normal, the point color, and a lighting model. The depth of each point from the viewpoint is computed via ray tracing. Points are sorted into discrete layers normal to the viewing direction based upon their depths. To create a color 2-D image of each layer, without visible gaps between sampled points, a circle is drawn or "splatted" for each point in each layer. A silhouette mask of each layer was derived from the color image as well.

These sets of 2-D image layers are then used to compute multiple holographic diffraction patterns (one for each layer with an "attached" holographic lens), which are then combined for a multiple layer hologram. The layers are independent of each other so the reconstructed holographic volume appears semi-transparent. Furthermore, as the viewpoint changes, the layers at different depths shift relative to each other due to parallax, and the layered structure becomes apparent.

To include occlusion and make the holographic object appear solid, a Ping-Pong method was used. For each layer, the Ping-Pong method computationally propagates light from the hologram plane forward with other planes' 2-D image mask silhouettes acting as occluders, then propagates the resultant light back to the hologram plane. From one viewpoint, the object now appears opaque and includes background points. However as the viewpoint changes, the layers at different depths shift relative to each other due to parallax and holes due to occlusion handling become apparent.

To solve the layer and occlusion artifacts, and to increase the viewing field of view of the hologram, multiple holograms are created from multiple views/viewpoints with a small field of view. For each new view, the layers can be realigned and the occlusion handling can be recomputed so that holes are not apparent for that corresponding view. These holograms are tiled in an array to form the final hologram displayed on the display 100. The display 100 optically combines the multiple, small field-of-view holograms into a single, large field-of-view hologram via angular tiling.

This method creates multiple, small field-of-view holograms to allow for rapidly computed holograms with view-dependent shading (e.g., highlights and specular materials, reflection, and iridescence), occlusion and disocclusion with parallax, and handle the off-axis layer parallax and occlusion hole artifacts of layered holograms.

In comparing these various algorithms, the point-based holographic rendering algorithm is relatively expensive because every point on the high-resolution hologram must determine the phase contribution of every point in a large 3-D model. Layer-based approaches should be significantly faster than point-based methods because they use a small number of layered 2-D images to represent this object, and the layers' holograms can be efficiently calculated using a Fast Fourier Transform (FFT) and application of a pre-computed holographic lens. However, the Ping-Pong method is still used to include occlusion. Also the layer holograms have a limited field of view before layer and occlusion hole artifacts become apparent. Our approach of creating multiple, small field-of-view holograms, optically angularly tiled together using the display 100, overcomes these artifacts.

The new approach (the second version of the algorithm) has significant improvements in creating the multiple sets of layered 2-D images from the 3-D model. In the previous method, separate routines for view transformation, per point lighting and texture computations, and layer point splatting were computed repeatedly for each point of a dense 3-D point cloud with attached normals. These routines are all replaced with the standard OpenGL color image renderings of a standard polygon model. Previous layer slicing via ray-tracing (point-based) and occlusion handling via the Ping-Pong method (image-based wavefront propagation) are replaced by masking the OpenGL's rendered color image with thresholded depth maps. Transparent objects can be handled as well, but it requires multiple passes since depth maps only encode the frontmost surface.

Compared to what was used in our first version of the algorithm, this rendering approach differs in the following ways: (1) using computer-generated imagery (CGI) rendering to replace lighting per point with interpolated lighting per vertex, (2) using CGI depth-sorting and occlusion to replace the Ping-Pong method, (3) using CGI depth rendering to replace ray-tracing calculation which is based on CPU computing, for producing the layer slicing, and (4) using CGI rendering support rasterization of polygon 3-D models to remove the need for point splatting of dense 3-D point clouds to fill in spaces between points.

There are a number of significant advantages of using such a rendering approach: (1) only the visible 2-D data with occlusion, shading, and texture information are kept for each view and they can be calculated easily. This is largely contributed by the back-face culling and depth sorting used in OpenGL which makes the accused occlusion cue rendering efficient and reduces the necessary object data to be taken into account for the specific view, (2) depth information is associated with each 2-D image only, (3) only a finite number of views are used which are sufficient to provide a smooth 3-D viewing effect and directional shading updates, (4) standard and optimized graphics pipeline (GPU acceleration) is used, which is compatible with standard polygon models, shaders, and other advanced CGI techniques (ambient occlusion, normal mapping, morph target animation, etc.), and (5) since only color and depth maps are required, the hologram may be computed from live imagery using color plus depth cameras.

Using the techniques disclosed herein, a calculation speed greater than typical point based methods, can be achieved via such an approach and using a single consumer graphics processing unit (GPU) card for the generation of the 3D hologram of a complicated object. The resulting 3D views have clear depth cues, occlusion and shading. The techniques are compatible with and take advantage of our Coarse Integral Holographic Display (CIHD) referred to above. An array of layered holograms of different viewpoints and with computed attached holographic lenses are angularly tiled using a single common transform lens. Real time rendering will allow us to generate interactive holograms, or achieve real time transmission and playback of holographic television on the CIHD.

One reason it was not obvious to use layers in this manner is that a layer-based image (with the gaps that naturally occur with layers) effectively has a narrow field of view. The designer of an algorithm would not be motivated to use an algorithm that provided only a narrow FOV. However, the inventors recognized that a number of different narrow FOV images angularly tiled together could produce a wide FOV super-hologram.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

At this point, methods and techniques for performing such computer-implemented methods will be discussed. Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Figure 7:
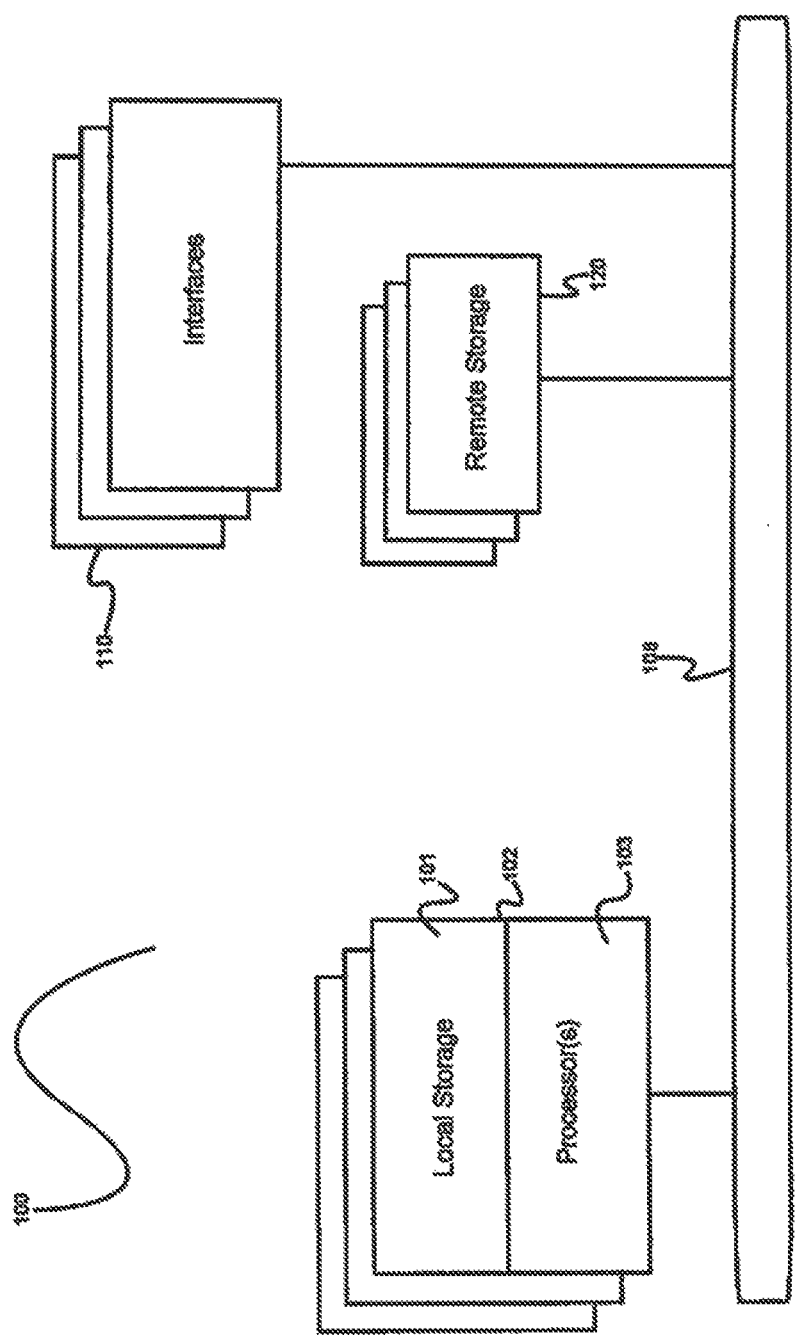
FIG. 7 is a block diagram illustrating an exemplary hardware architecture of a computing device used in an embodiment of the disclosure herein.

Referring now to FIG. 7, there is shown a block diagram depicting an exemplary computing device 800 suitable for implementing at least a portion of the features or functionalities disclosed herein. Computing device 800 may be, for example, any one of the computing machines listed in the previous paragraph, or indeed any other electronic device capable of executing software- or hardware-based instructions according to one or more programs stored in memory. Computing device 800 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 800 includes one or more central processing units (CPU) 802, one or more graphic processing units (GPU) (not shown), one or more interfaces 810, and one or more busses 806 (such as a peripheral component interconnect (PCI) bus). When acting under the control of appropriate software or firmware, CPU 802 may be responsible for implementing specific functions associated with the functions of a specifically configured computing device or machine. For example, in at least one embodiment, a computing device 800 may be configured or designed to function as a server system utilizing CPU 802, local memory 801 and/or remote memory 820, and interface(s) 810.

In at least one embodiment, CPU 802 may be caused to perform one or more of the different types of functions and/or operations under the control of software modules or components, which for example, may include an operating system and any appropriate applications software, drivers, and the like. CPU 802 may include one or more processors 803 such as, for example, a processor from one of the Intel, ARM, Qualcomm, and AMD families of microprocessors. In some embodiments, processors 803 may include specially designed hardware such as application-specific integrated circuits (ASICs), electrically erasable programmable read-only memories (EEPROMs), field-programmable gate arrays (FPGAs), and so forth, for controlling operations of computing device 800. In a specific embodiment, a local memory 801 (such as non-volatile random access memory (RAM) and/or read-only memory (ROM), including for example one or more levels of cached memory) may also form part of CPU 802. However, there are many different ways in which memory may be coupled to system 800. Memory 801 may be used for a variety of purposes such as, for example, caching and/or storing data, programming instructions, and the like. Similarly, in at least one embodiment, multiple processing cores of GPU may be caused to perform sequences of different steps or functions in parallel (independently and concurrently) for different parts of the image or computation.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, a graphics processing unit, stream processing unit, and any other programmable circuit.

In one embodiment, interfaces 810 are provided as network interface cards (NICs). Generally, NICs control the sending and receiving of data packets over a computer network; other types of interfaces 810 may for example support other peripherals used with computing device 800. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 810 may include ports appropriate for communication with appropriate media. In some cases, they may also include an independent processor and, in some in stances, volatile and/or non-volatile memory (e.g., RAM).

Although the system shown in FIG. 7 illustrates one specific architecture for a computing device 100 for implementing one or more of the embodiments described herein, it is by no means the only device architecture on which at least a portion of the features and techniques described herein may be implemented. For example, architectures having one or any number of processors 803 may be used, and such processors 803 may be present in a single device or distributed among any number of devices. In one embodiment, a single processor 803 handles communications as well as routing computations, while in other embodiments a separate dedicated communications processor may be provided. In various embodiments, different types of features or functionalities may be implemented in a system that includes a client device (such as a tablet device or smartphone running client software) and server systems (such as a server system described in more detail below).

Regardless of network device configuration, the system may employ one or more memories or memory modules (such as, for example, remote memory block 820 and local memory 801) configured to store data, program instructions for the general-purpose network operations, or other information relating to the functionality of the embodiments described herein (or any combinations of the above). Program instructions may control execution of or comprise an operating system and/or one or more applications, for example. Memory 820 or memories 801, 820 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 8:
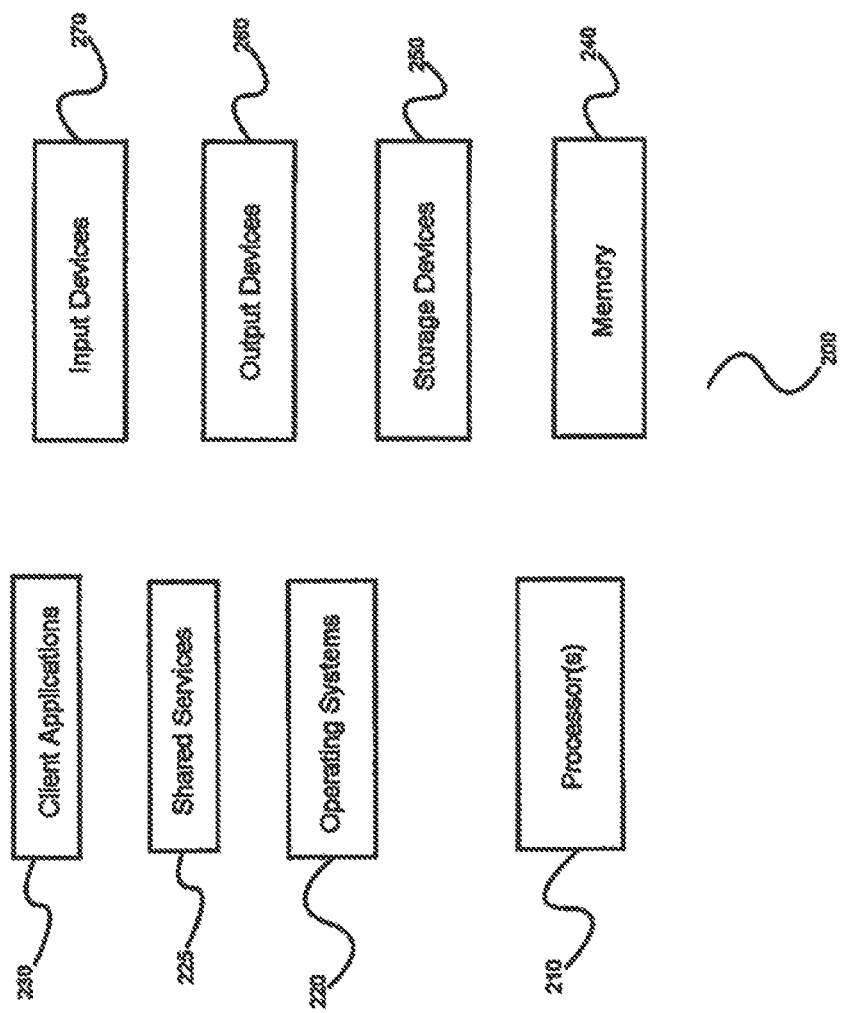
FIG. 8 is a block diagram illustrating an exemplary logical architecture for a client device, according to an embodiment of the disclosure herein.

In some embodiments, systems may be implemented on a standalone computing system. Referring now to FIG. 8, there is shown a block diagram depicting a typical exemplary architecture of one or more embodiments or components thereof on a standalone computing system. Computing device 900 includes processors 910 that may run software that carry out one or more functions or applications of embodiments, such as for example a client application 930. Processors 910 may carry out computing instructions under control of an operating system 920 such as, for example, a version of Microsoft's Windows™ operating system, Apple's Mac OS/X or iOS operating systems, some variety of the Linux operating system, Google's Android™ operating system, or the like. In many cases, one or more shared services 925 may be operable in system 900, and may be useful for providing common services to client applications 930. Services 925 may for example be Windows™ services, user-space common services in a Linux environment, or any other type of common service architecture used with operating system 910. Input devices 970 may be of any type suitable for receiving user input, including for example a keyboard, touchscreen, microphone (for example, for voice input), mouse, touchpad, trackball, or any combination thereof. Output devices 960 may be of any type suitable for providing output to one or more users, whether remote or local to system 900, and may include for example one or more screens for visual output, speakers, printers, or any combination thereof. Memory 940 may be random-access memory having any structure and architecture known in the art, for use by processors 910, for example to run software. Storage devices 950 may be any magnetic, optical, mechanical, memristor, or electrical storage device for storage of data in digital form. Examples of storage devices 950 include flash memory, magnetic hard drive, CD-ROM, and/or the like.

Figure 9:
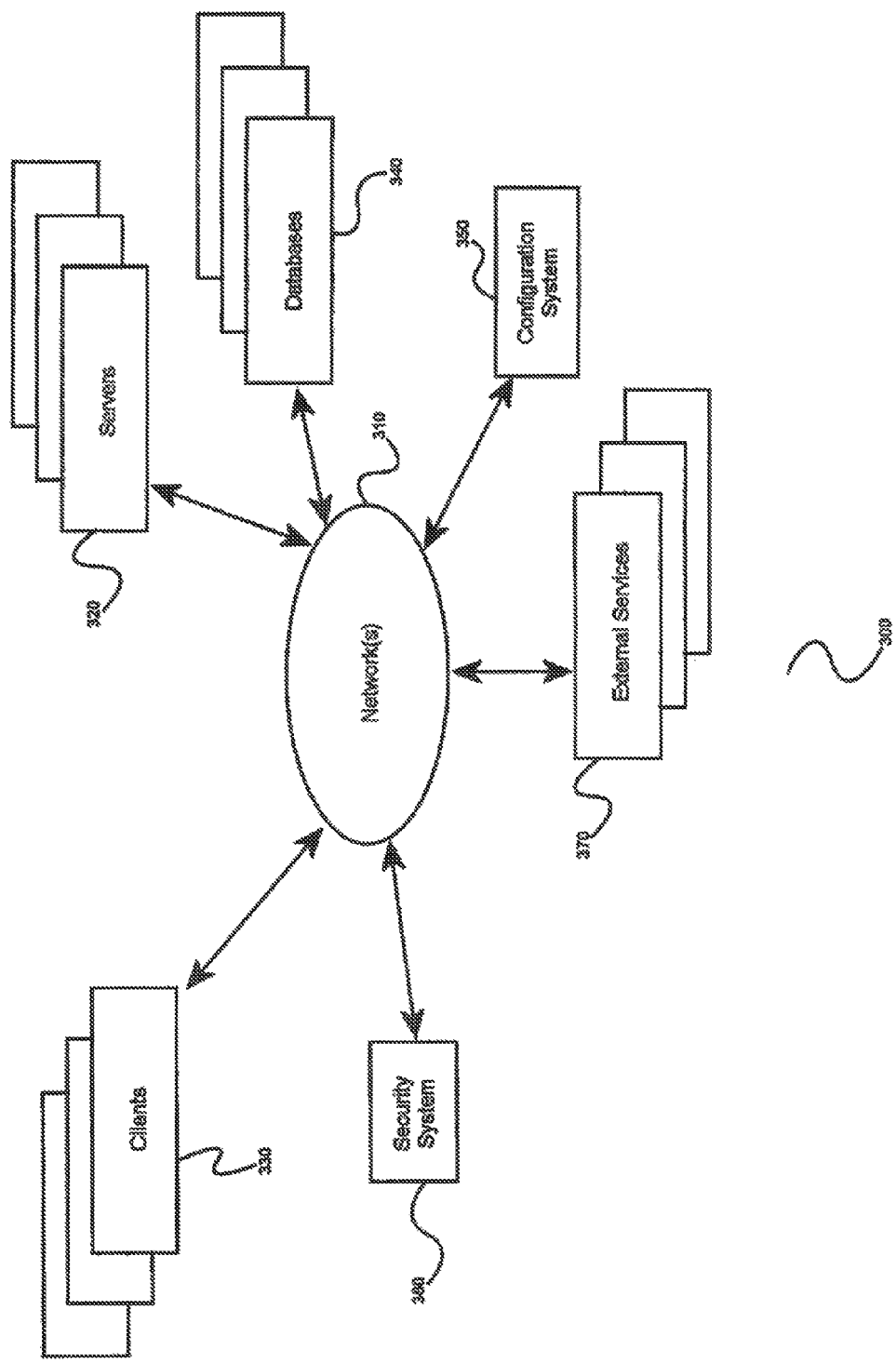
FIG. 9 is a block diagram illustrating an exemplary architectural arrangement of clients, servers, and external services, according to an embodiment of the disclosure herein.

In some embodiments, systems may be implemented on a distributed computing network, such as one having any number of clients and/or servers. Referring now to FIG. 9, there is shown a block diagram depicting an exemplary architecture for implementing at least a portion of a system according to an embodiment on a distributed computing network. According to the embodiment, any number of clients 1030 may be provided. Each client 1030 may run software for implementing client-side portions of the embodiments and clients may comprise a system 900 such as that illustrated in FIG. 8. In addition, any number of servers 1020 may be provided for handling requests received from one or more clients 1030. Clients 1030 and servers 1020 may communicate with one another via one or more electronic networks 1010, which may be in various embodiments any of the Internet, a wide area network, a mobile telephony network, a wireless network (such as WiFi, Wimax, and so forth), or a local area network (or indeed any network topology known in the art; no one network topology is preferred over any other). Networks 1010 may be implemented using any known network protocols, including for example wired and/or wireless protocols.

In addition, in some embodiments, servers 1020 may call external services 1070 when needed to obtain additional information, or to refer to additional data concerning a particular call. Communications with external services 1070 may take place, for example, via one or more networks 1010. In various embodiments, external services 1070 may comprise web-enabled services or functionality related to or installed on the hardware device itself. For example, in an embodiment where client applications 930 are implemented on a smartphone or other electronic device, client applications 930 may obtain information stored in a server system 1020 in the cloud or on an external service 1070 deployed on one or more of a particular enterprise's or user's premises.

In some embodiments, clients 1030 or servers 1020 (or both) may make use of one or more specialized services or appliances that may be deployed locally or remotely across one or more networks 1010. For example, one or more databases 1040 may be used or referred to by one or more embodiments. It should be understood by one having ordinary skill in the art that databases 1040 may be arranged in a wide variety of architectures and using a wide variety of data access and manipulation means. For example, in various embodiments one or more databases 1040 may comprise a relational database system using a structured query language (SQL), while others may comprise an alternative data storage technology such as those referred to in the art as "NoSQL" (for example, Hadoop Cassandra, Google Big-Table, and so forth). In some embodiments, variant database architectures such as column-oriented databases, in-memory databases, clustered databases, distributed databases, or even flat file data repositories may be used. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments may make use of one or more security systems 1060 and configuration systems 1050. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 1060 or configuration system 1050 or approach is specifically required by the description of any specific embodiment.

In various embodiments, functionality for implementing systems or methods may be distributed among any number of client and/or server components. For example, various software modules may be implemented for performing various functions, and such modules can be variously implemented to run on server and/or client components.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

We claim:

1. A computer-implemented method for computing an array of two-dimensional holographic diffraction patterns each representative of an image of a particular scene, comprising:
   for the first of the holographic diffraction patterns of the array:
      obtaining a two-dimensional color image of one view of the scene from a first viewing angle;
      obtaining corresponding depth information about the scene;
      creating two-dimensional image layers from the color image and the depth information;
      encoding spatial information in each of the two-dimensional image layers into a two-dimensional diffraction pattern for that layer by applying a Fourier-Fresnel Transform to each two-dimensional image layer; and
      combining together the two-dimensional diffraction pattern information for each of the two-dimensional image layers to compute the two-dimensional holographic diffraction pattern representative of that view;
   repeating the above operations for a plurality of other views of the scene, wherein each different view is taken from a different viewing angle; and
   combining together each of the two-dimensional holographic diffraction patterns into an array of two-dimensional holographic diffraction patterns where each two-dimensional holographic diffraction pattern is representative of a different view of the scene and where each diffraction pattern in the array is angularly-tiled with respect to each adjacent diffraction pattern so each diffraction pattern in the array represents a distinct and different view of the scene.

2. A computer-implemented method as defined in claim 1, further including for each layer adding a holographic lens to the two-dimensional diffraction pattern information for that layer.

3. A computer-implemented method as defined in claim 1, wherein the two-dimensional color image and the corresponding depth information come from computer graphics rendering.

4. A computer-implemented method as defined in claim 1, wherein the two-dimensional color image and the corresponding depth information come from a camera.

5. A computer-implemented method as defined in claim 1, further including displaying images based on the array of two-dimensional holographic diffraction patterns with an angularly-tiled holographic display system.

6. A computer-implemented method as defined in claim 1, wherein the operation of creating two-dimensional image layers includes thresholding based on the depth information.

7. A computer-implemented method as defined in claim 1, wherein the operation of creating two-dimensional image layers includes depth blending based on the depth information.

8. A computer-implemented method as defined in claim 1, further including storing the array of two-dimensional holographic diffraction patterns.

9. A computer-implemented method as defined in claim 8, further including displaying holographic images based on the stored array of two-dimensional holographic diffraction patterns.

10. A computer-implemented method as defined in claim 1, further including displaying holographic images based on the stored array of two-dimensional holographic diffraction patterns.

11. A method for computing and displaying an array of holographic images each representative of a different image of a particular scene, comprising:
   for the first of the holographic images of the array:
      obtaining a color image of one view of the scene;
      obtaining corresponding depth information about the scene;
      creating image layers from the color image, the depth information, and depth blending;
      encoding spatial and depth information in each of the image layers into diffraction patterns for that layer; and
      combining together the diffraction patterns for each of the image layers to compute the holographic diffraction pattern representative of that view;
   repeating the above operations for each of the other holographic diffraction patterns of the array where each holographic diffraction pattern is representative of a different view of the scene; and
   displaying each of the array of a holographic images on an angularly-tiled holographic display system, where each image of the array of holographic images represents a distinct and different view of the scene.

12. A method as defined in claim 11, wherein the angularly-tiled holographic display system includes one or more spatial light modulators.

13. A method as defined in claim 11, further including for each layer adding a holographic lens to the diffraction pattern information for that layer.

14. A method as defined in claim 11, wherein the color image and the corresponding depth information come from a camera.

15. A method as defined in claim 11, wherein the operation of creating image layers includes thresholding based on the depth information.

16. A computer-implemented method for computing an array of holographic diffraction patterns each representative of an image of a particular scene, comprising:
   for the first of the holographic diffraction patterns of the array:
      creating image layers that include color image, depth information, and depth blending about one view of a scene;
      encoding spatial information in each of the image layers into a diffraction pattern for that layer, where each diffraction pattern includes all of a plurality of points of the image of the scene at a particular depth; and
      combining together the diffraction pattern for each of the image layers to compute the holographic diffraction pattern representative of that view; and
   repeating the above operations for each of the other holographic diffraction patterns of the array where each holographic diffraction pattern is representative of a different view of the scene;
   wherein the method is free of use of the Ping-Pong method of image-based wavefront propagation.

17. A computer-implemented method as defined in claim 16, further including for each layer adding a holographic lens to the diffraction pattern information for that layer.

18. A computer-implemented method as defined in claim 16, wherein the color image and the corresponding depth information come from a camera.

19. A computer-implemented method as defined in claim 16, wherein the operation of creating image layers includes thresholding based on the depth information.

* * * * *